United States Patent
Usynin et al.

(10) Patent No.: US 7,890,813 B2
(45) Date of Patent: Feb. 15, 2011

(54) METHOD AND APPARATUS FOR IDENTIFYING A FAILURE MECHANISM FOR A COMPONENT IN A COMPUTER SYSTEM

(75) Inventors: Alexander V. Usynin, Knoxville, TN (US); Aleksey M. Urmanov, San Diego, CA (US); Kenny C. Gross, San Diego, CA (US)

(73) Assignee: Oracle America, Inc., Redwood Shores, CA (US)

(*) Notice: Subject to any disclaimer, the term of this patent is extended or adjusted under 35 U.S.C. 154(b) by 853 days.

(21) Appl. No.: 11/432,644

(22) Filed: May 11, 2006

(65) Prior Publication Data

US 2007/0294591 A1 Dec. 20, 2007

(51) Int. Cl.
*G06F 11/00* (2006.01)

(52) U.S. Cl. .......................... 714/45; 714/25; 702/182; 702/183; 379/106.01; 379/106.02; 379/106.03; 600/513

(58) Field of Classification Search .................. 714/25; 702/182, 183; 379/106.01, 106.02, 106.03; 600/513
See application file for complete search history.

(56) References Cited

U.S. PATENT DOCUMENTS

| | | | | |
|---|---|---|---|---|
| 4,553,213 A | * | 11/1985 | Hyatt ........................ | 332/185 |
| 5,625,583 A | * | 4/1997 | Hyatt ........................ | 365/45 |
| 2002/0183971 A1 | * | 12/2002 | Wegerich et al. ........... | 702/185 |
| 2004/0078171 A1 | * | 4/2004 | Wegerich et al. ........... | 702/188 |
| 2006/0036403 A1 | * | 2/2006 | Wegerich et al. ........... | 702/183 |
| 2006/0122525 A1 | * | 6/2006 | Shusterman ............... | 600/513 |
| 2006/0212755 A1 | * | 9/2006 | Urmanov et al. ............ | 714/25 |
| 2007/0146189 A1 | * | 6/2007 | Wesselink et al. ........... | 341/155 |
| 2007/0265533 A1 | * | 11/2007 | Tran .......................... | 600/481 |

* cited by examiner

*Primary Examiner*—Robert Beausoliel
*Assistant Examiner*—Jeison C Arcos
(74) *Attorney, Agent, or Firm*—Park, Vaughan, Fleming & Dowler LLP

(57) ABSTRACT

One embodiment of the present invention provides a system that identifies a failure mechanism for a component. The system first constructs a library of failure signatures from a set of components, wherein each failure signature in the library characterizes a known failure mechanism associated with a component in the set of components. Next, the system receives a telemetry signal which is measured from a component under surveillance. The system then determines if there is an anomaly in the telemetry signal. If so, the system performs pattern-matching operations between the telemetry signal and failure signatures in the library. Next, if a match is found, the system identifies the failure mechanism for the component under surveillance based on the matching failure signature.

15 Claims, 5 Drawing Sheets

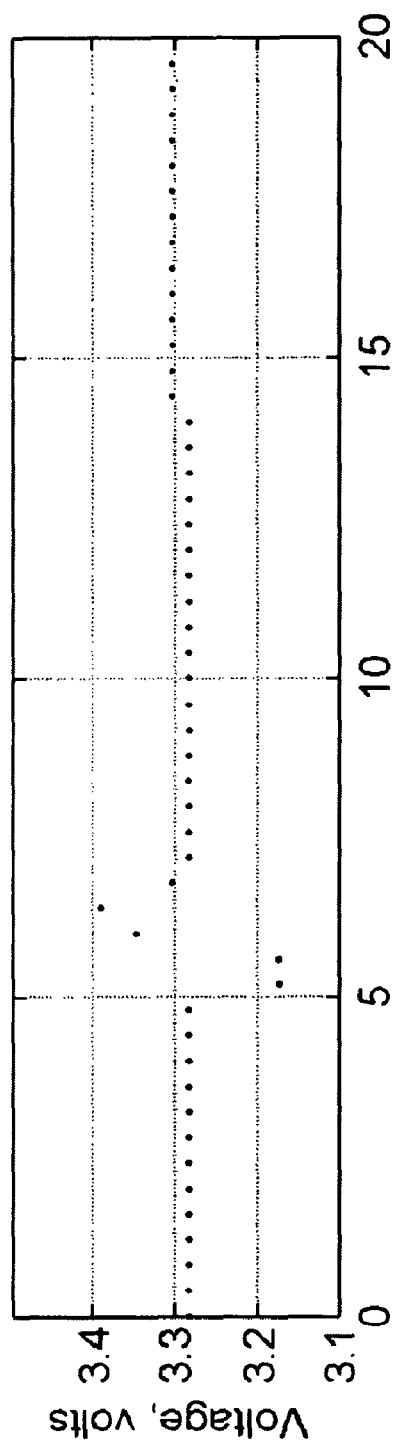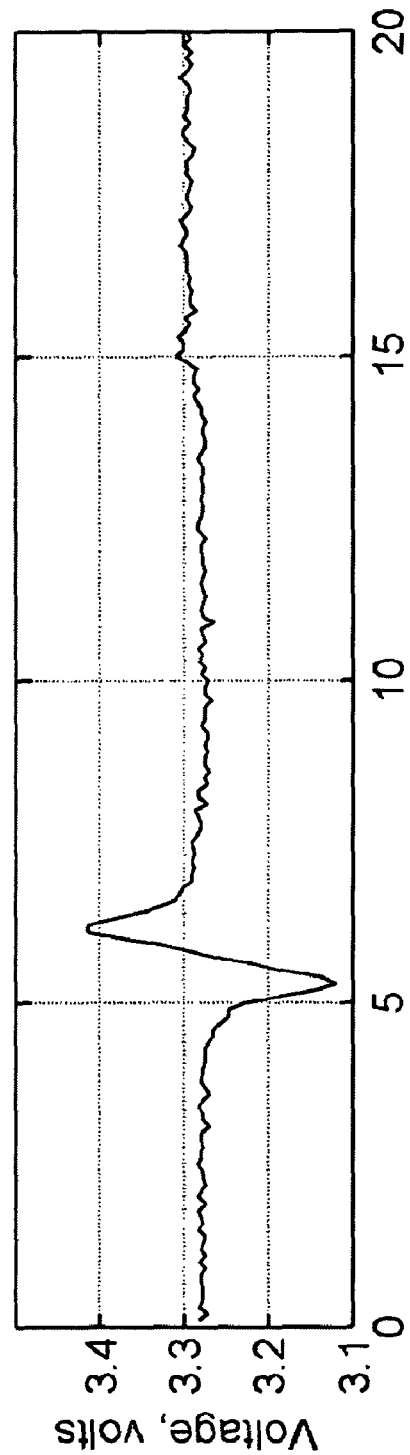
FIG. 5A
FIG. 5B

METHOD AND APPARATUS FOR IDENTIFYING A FAILURE MECHANISM FOR A COMPONENT IN A COMPUTER SYSTEM

BACKGROUND

1. Field of the Invention

The present invention relates to techniques for performing a root-cause analysis on a faulty computer system. More specifically, the present invention relates to a method and an apparatus that automatically identifies a failure mechanism associated with a signal measured from a faulty component in a computer system.

2. Related Art

Modern server systems are typically equipped with a significant number of sensors which monitor signals during the operation of the server systems. For example, these monitored signals can include temperatures, voltages, currents, and a variety of software performance metrics, including CPU usage, I/O traffic, and memory utilization. Outputs from this monitoring process can be used to generate time series data for these signals which can subsequently be analyzed to determine how well a computer system is operating.

One particularly useful application of this analysis technique is to facilitate "proactive fault-monitoring" to identify leading indicators of component or system failures before the failures actually occur. Typically, this is achieved by detecting anomalies in the signals which may potentially lead to system failures.

For example, a system can detect anomaly in a monitored signal when the monitored signal exceeds a threshold level. More specifically, critical system variables can be measured and recorded at predetermined intervals, and the collected measurement values can be compared against some predetermined threshold values. If a particular variable overshoots its corresponding threshold, a fault condition can be flagged.

Another existing technique detects anomalies in monitored signals through pattern recognition. This technique compares measured time series data against learned "normal" signal patterns and detects anomalies in the measured time series data if abnormal correlation patterns are found. This technique is described in U.S. patent application Ser. No. 10/903,160, entitled, "Method for High Sensitivity Detection of Anomalous Signals in Systems with Low Resolution Sensing," by inventors Kalyan Vaidyanathan, Aleksey Urmanov, and Kenny C. Gross.

However, the above-described techniques have been developed to provide early fault detection rather than to identify the root cause of a fault condition. In other words, once an anomaly is detected using any of the above approaches, it is still left to a human repair engineer to diagnose the root cause of the anomaly. Unfortunately, a monitoring system that lacks the ability to identify the root cause of a fault cannot provide correct solutions for dealing with the fault.

In practice there are some failure mechanisms which are characterized by distinctive and reproducible dynamic signatures in the corresponding recorded time series data. Two specific examples which occur in certain types of computer servers are: (1) a "restart" of one of two redundant power supplies which generates a transient dynamic voltage pulse that can cause a machine to crash; and (2) a defective MPI-type socket undergoing a "reset" event that can cause the system board core voltage to spike downward and then slowly recover. In both of these examples, a field engineer monitoring the dynamic telemetry signature can immediately recognize the "fingerprint" of the underlying degradation mechanisms. However, it is not possible to have humans looking at these telemetry signatures on a 24×7 basis.

Hence, what is needed is a method and apparatus for automatically performing a root cause analysis to identify possible failure mechanisms for anomalous telemetry signals without the above-described problems.

SUMMARY

One embodiment of the present invention provides a system that identifies a failure mechanism for a component. During operation, the system first constructs a library of failure signatures from a set of components, wherein each failure signature in the library characterizes a known failure mechanism associated with a component in the set of components. Next, the system receives a telemetry signal which is measured from a component under surveillance. The system then determines if there is an anomaly in the telemetry signal. If so, the system performs pattern-matching operations between the telemetry signal and failure signatures in the library. Next, if a match is found, the system identifies the failure mechanism for the component under surveillance based on the matching failure signature.

In a variation on this embodiment, the system constructs the library of failure signatures by constructing a failure signature for each known failure mechanism of a component. Specifically, the system first receives one or more faulty specimens of the component, wherein the one or more faulty specimens are associated with a known failure mechanism. Next, the system collects high-resolution, high-sampling-rate telemetry signals from the one or more faulty specimens, wherein the high-resolution, high-sampling-rate telemetry signals contain the failure signature of the known failure mechanism associated with the component. The system then stores the failure signature for the known failure mechanism of the component in the library of failure signatures.

In a further variation on this embodiment, the system stores the failure signatures in the library of failure mechanisms by: (1) constructing an auto-associative memory matrix for the failure signatures; or (2) constructing a plurality of auto-associative memory matrices for the failure signatures.

In a variation on this embodiment, the telemetry signal measured from the component under surveillance can have: (1) low resolution; or (2) low-sampling-rate.

In a further variation on this embodiment, the system performs the pattern-matching operations between the telemetry signal and the failure signatures in the library by using an auto-associative memory. Specifically, the system first feeds the anomalous telemetry signal as an input vector into the auto-associative memory. Next, the system allows the auto-associative memory to restore a matching failure signature for the input vector from the auto-associative memory matrix.

In a further variation on this embodiment, the system restores the matching failure signature by reconstructing a high-resolution, high-sampling-rate failure signature from a low-resolution, low-sampling-rate input telemetry signal.

BRIEF DESCRIPTION OF THE FIGURES

FIG. 5A illustrates a low-resolution, low-sampling-rate time series telemetry signal containing an incomplete failure signature for a faulty power supply.

FIG. 5B illustrates a restored high-resolution, high-sampling-rate failure signature associated with the telemetry signal in FIG. 5A which was obtained using a pattern-matching technique.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Real-Time Telemetry System

Figure 1:
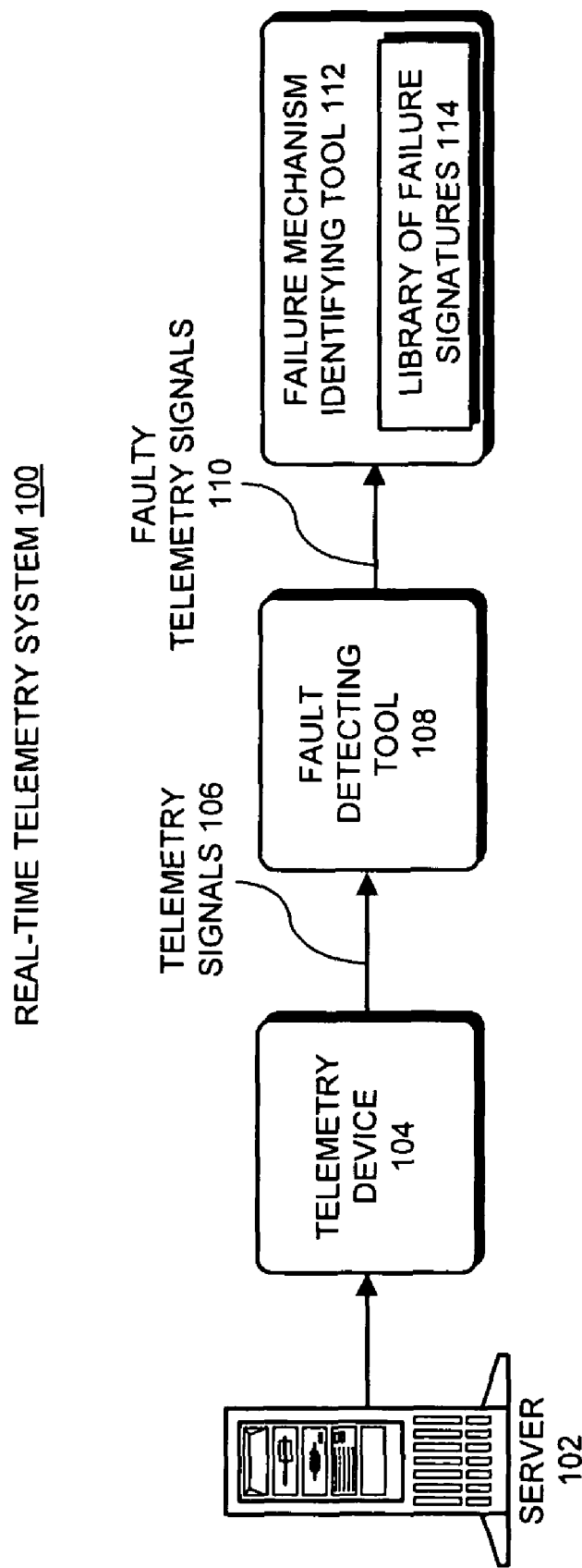
FIG. 1 illustrates real-time telemetry system in accordance with an embodiment of the present invention.

FIG. 1 illustrates real-time telemetry system 100 in accordance with an embodiment of the present invention. Real-time telemetry system 100 contains server 102. Server 102 can generally include any computational node including a mechanism for servicing requests from a client for computational and/or data storage resources. In the present embodiment, server 102 is a uniprocessor or multiprocessor server that is being monitored by real-time telemetry system 100.

Note that the present invention is not limited to the computer server system illustrated in FIG. 1. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Real-time telemetry system 100 also contains telemetry device 104, which gathers telemetry signals 106 from the various sensors and monitoring tools within server 102, and directs telemetry signals 106 to a local or a remote location that contains fault-detecting tool 108.

Note that telemetry signals 106 gathered by real-time telemetry system 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, idle time, memory utilization, disk activity, transaction latencies, and other performance metrics reported by the operating system.

Fault-detecting tool 108 monitors and analyzes telemetry signals 106 in real-time. Specifically, fault-detecting tool 108 detects anomalies in telemetry signals 106 and by analyzing telemetry signals 106, predicts probabilities of specific faults and failures in server 102. In one embodiment of the present invention, fault-detecting tool 108 is a Continuous System Telemetry Harness (CSTH), which performs a Sequential Probability Ratio Test (SPRT) on telemetry signals 106. Note that the SPRT provides a technique for monitoring noisy process variables and detecting the incipience or onset of anomalies in such processes with high sensitivity. In one embodiment of the present invention, telemetry device 104 and fault-detecting tool 108 are both embedded in server 102 which is being monitored.

When fault-detecting tool 108 detects anomalies in telemetry signals 106, fault-detecting tool 108 sends faulty telemetry signals 110 to failure-mechanism-identifying tool 112. Failure-mechanism-identifying tool 112 uses a library of failure signatures 114, which are learned from faulty components containing known failure mechanisms. In doing so, failure-mechanism-identifying tool 112 performs root cause analyses on faulty telemetry signals 110 by comparing the faulty telemetry signals to the failure signatures in library 114 to identify possible failure mechanisms associated with each of the faulty telemetry signals.

Constructing the Library of Failure Signatures

Some known failure mechanisms of failed components or systems are linked to distinctive and reproducible dynamic behaviors in the recorded time series signals measured from such components or systems. These distinctive and reproducible dynamic behaviors in the time series signals can then be used to build the associated failure signatures, which characterize the known failure mechanisms. However, not all recorded time series signals from failed components or systems contain such distinctive and reproducible dynamic behaviors to build failure signatures.

Figure 2:
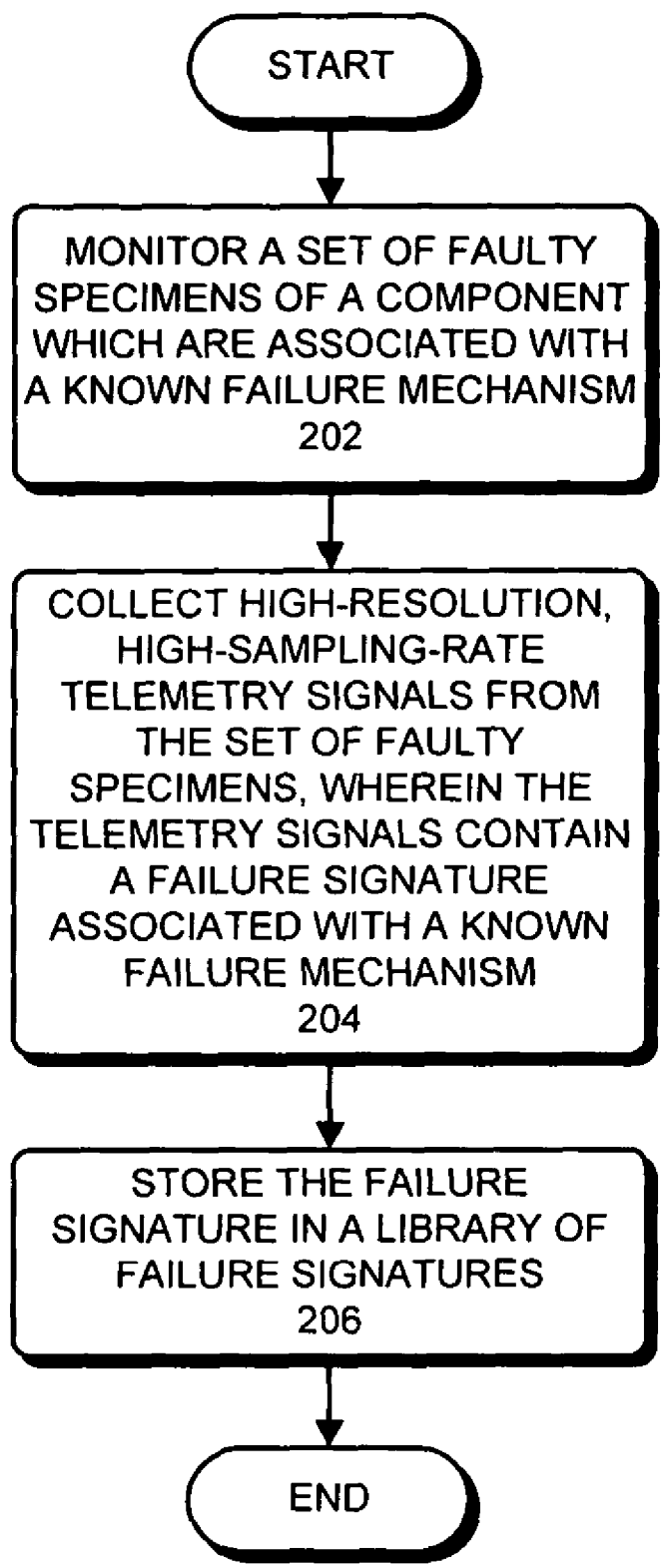
FIG. 2 presents a flowchart illustrating the process of constructing a library of failure signatures in accordance with an embodiment of the present invention.

FIG. 2 presents a flowchart illustrating the process of constructing a library of failure signatures in accordance with an embodiment of the present invention. Note that each of the failure signatures in the library is associated with a known failure mechanism of a component within a computer system, such as a solder joint crack in a power supply.

During operation, the system first monitors a set of faulty specimens of a specific component, such a power supply or a system board, wherein the set of faulty specimens are linked to the same known failure mechanism of the component (step 202). Note that these faulty specimens are still operational and do not cause an immediate system error or crash.

Next, while monitoring these faulty specimens, the system collects high-resolution, high-sampling-rate telemetry signals from the set of the faulty specimens, wherein the high-resolution, high-sampling-rate telemetry signals contain the failure signature of the known failure mechanism associated with the component (step 204). Note that the set of faulty specimens may have different degrees of degradation. Hence, we need a sufficient number of specimens to obtain a statistically significant amount of data to build a high-accuracy failure signature. Also note that a high-resolution, high-sampling-rate failure signature is desirable to be used in pattern recovery operations.

The system then stores the failure signature for the known failure mechanism in the library of failure signatures (step 206). In one embodiment of the present invention, the library of failure signatures is built as an auto-associative memory matrix, wherein the system stores all the failure signatures in the library of failure signatures into the associated auto-associative memory matrix. In another embodiment of the present invention, the system can store the failure signatures in the library of failure signatures into different auto-associative memory matrices based on different types or levels of failure patterns (e.g., one can build a matrix for power supply failure signatures and another matrix for a system level failure signatures). For simplicity, the discussion below will be based on using a single auto-associative memory matrix.

Note that it is advantageous for using the auto-associative memory technique because it facilitates restoring severely distorted failure signatures embedded in a low-resolution and low-sampling-rate time series signals, as is discussed in more details below.

Identifying a Failure Mechanism Using Failure Signatures

Figure 3:
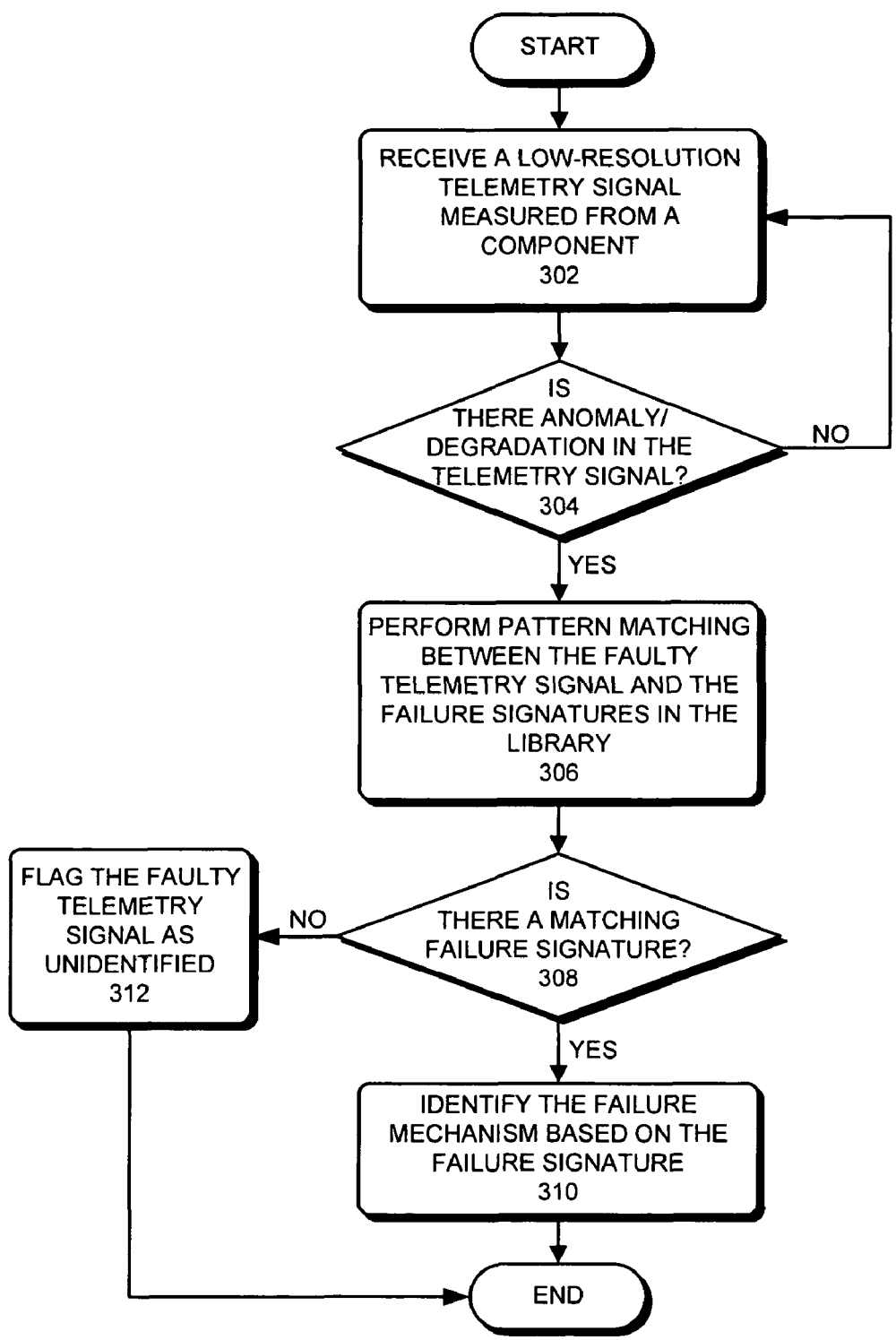
FIG. 3 presents a flowchart illustrating the process of identifying the failure mechanism for the faulty component using failure signatures in accordance with an embodiment of the present invention.

Once the library of failure signature is available, it can be used to identify a failure mechanism for a faulty component. FIG. 3 presents a flowchart illustrating the process of identifying the failure mechanism for the faulty component using failure signatures in accordance with an embodiment of the present invention.

During operation, the system first obtains a telemetry time series signal which is measured from a component under surveillance (step 302). In particular, the received telemetry signal can have low-resolution and/or a low-sampling-rate due to limitations of the instruments that generate the signal.

Next, the system determines if there is an anomaly or degradation in the telemetry signal (step 304). In one embodiment of the present invention, the system applies standard fault-detection techniques to evaluate the telemetry signal, which can include using the threshold-detection technique or the pattern-recognition technique mentioned in the background section.

If the telemetry signal is found to be anomalous, the system subsequently performs a pattern-matching operation between the faulty telemetry signal and the failure signatures in the library (step 306). The goal of the pattern-matching operation is to identify the presence in the telemetry signal of any constituent of a failure signature in the library, which facilitates identifying a possible root cause for the faulty telemetry signal. The system subsequently determines if the pattern-matching operation identifies a match between the faulty telemetry signal and a failure signature in the library (step 308).

Next, if the system finds a match between the faulty telemetry signal and a failure signature in the library, the system identifies the root cause of failure for the fault based on the failure mechanism associated with the failure signature (step 310). Otherwise, if no match is found between the faulty telemetry signal and failure signatures, the system flags the telemetry signal as "unidentified" and passes it to conventional fault management tools (step 312).

In one embodiment of the present invention, the pattern-matching operation in step 306 of FIG. 3 is an auto-associative-memory-based pattern-matching operation and the failure signatures are stored in the auto-associative memory matrix.

Figure 4:
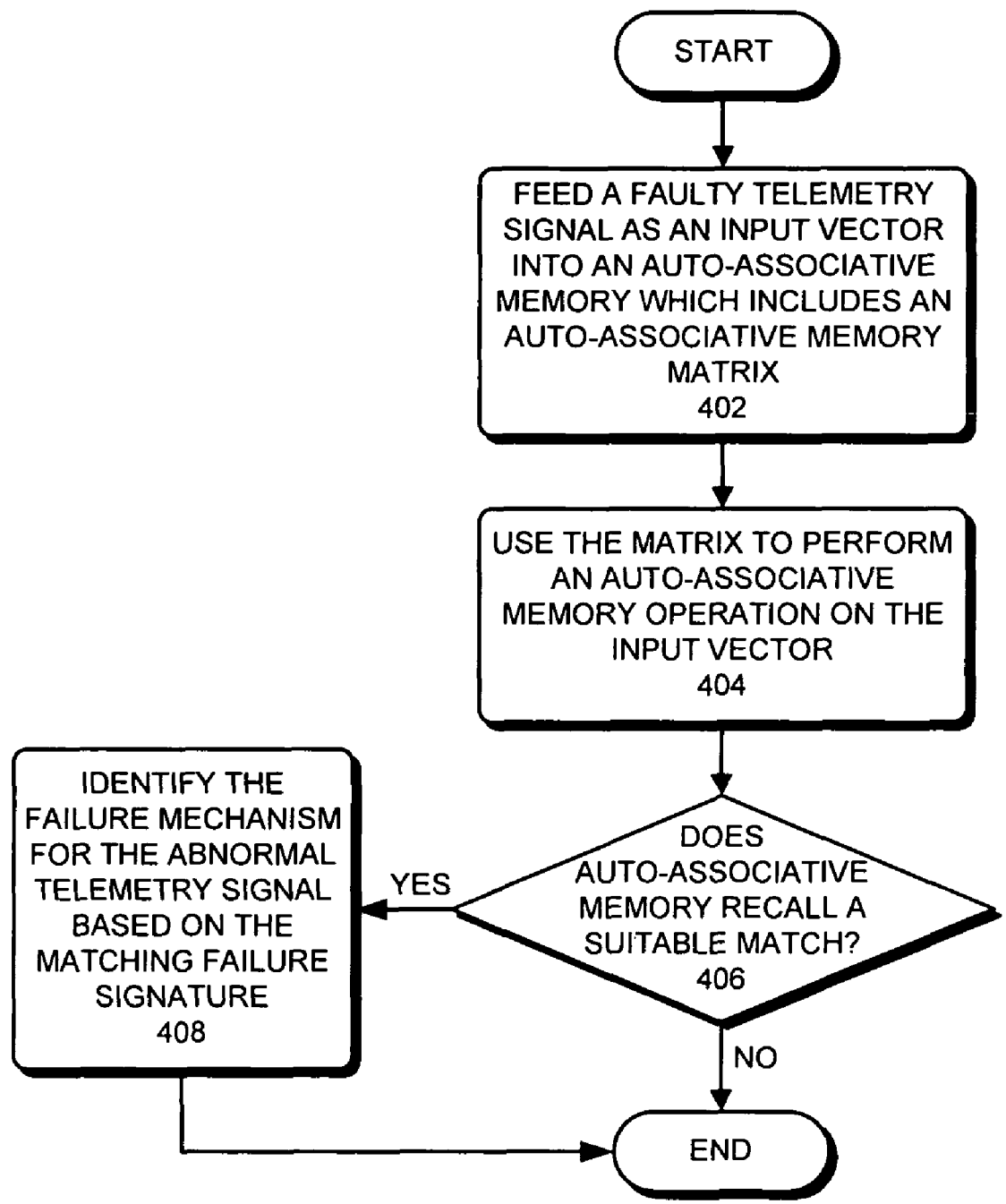
FIG. 4 presents a flowchart illustrating the process of performing the auto-associative memory based pattern-matching between the telemetry signal and the failure signatures in accordance with an embodiment of the present invention.

FIG. 4 presents a flowchart illustrating the process of performing the auto-associative-memory-based pattern-matching between the telemetry signal and the failure signatures in accordance with an embodiment of the present invention.

During operation, the system feeds the faulty telemetry signal as an input vector into an auto-associative-memory-based pattern-matching system (step 402).

Next, the system performs an auto-associative memory operation on the input vector by using the auto-associative memory matrix (step 404).

Note that the faulty telemetry signal is typically measured with an internal instrument (e.g., a temperature sensor embedded in a CPU core) inside the computer system, which can have low-resolution or a low-sampling-rate due to limitations of the internal instrument. These limitations can be caused by low-resolution A/D converters used to sample the signal, and limited bandwidth for outputting the telemetry signal. Furthermore, the faulty telemetry signal can be severely distorted due to interference and/or added noise. The auto-associative memory technique utilizes the high-resolution, high-sampling-rate failure signature to facilitate recovering a partially-matched pattern from a corresponding noisy and incomplete version.

Generally, an auto-associative-memory technique can be expressed as:

$$x'=Mx,$$

wherein x is the input vector, M is the auto-associative memory matrix, and x' is a recalled vector of the same dimension as the input vector x.

A number of publicized auto-associative memory techniques can be applied to the present invention. One embodiment of the present invention uses the Generalized Inverse (GI) associative memory technique. The GI memory matrix is constructed as an optimal solution under the mean-square-error criterion, wherein the GI memory matrix is given by the following expression:

$$M_{GI}=XX^{+},$$

where X is an (n×m) matrix of input (key) vectors x, n is the dimension of an input vector x, m is the number of associations to be stored in the memory matrix $M_{GI}$, and $X^{+}$ denotes the generalized inverse of the matrix X.

Next, the system determines if the auto-associative memory operation restores a suitable matched pattern to the input vector (step 406). If so, the system uses the failure signature associated with the matched pattern to identify the failure mechanism for the faulty telemetry signal (step 408).

EXAMPLE

FIG. 5 illustrates an exemplary process for identifying a root cause for a faulty power supply in a server system in accordance with an embodiment of the present invention.

A known type of degradation in this type of power supplies is characterized by distinctive and reproducible transients in the output voltages which contain a characteristic pattern: a dip followed by a spike. Unfortunately, the time series telemetry signals obtained from these power supplies contain only low-resolution, low-sampling-rate signal values. This low-resolution, low-sampling rate time series contains an incomplete version of the actual failure signature, which is shown in FIG. 5A.

Note that it is typically difficult to evaluate the characteristics, such as amplitude and duration of the transient behavior based on such noisy and incomplete information.

However, by using an auto-associative memory, one is able to reconstruct (recall) the complete failure signature of the recorded transient. Specifically, using external high-resolution instrument, the system collects high-resolution failure signatures from a population of components known to be faulty and stores these high-resolution failure signatures into an associated auto-associative memory matrix. The system then performs the auto-associative memory-based pattern-matching on the low-resolution telemetry signal in FIG. 5A. If the failure signature library contains the high-resolution version of the transient behavior of the power supply, the system is able to recall the high-resolution version based on the low-resolution version, which is shown in FIG. 5B. This allows the system to identify the root cause of the failure associated with the low-resolution faulty signal.

Note that detecting above power supply problems is important because the faults in power supplies can induce failures in higher-level components of a computer system.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying a failure mechanism for a component, comprising:
   constructing a library of failure signatures from a set of components, wherein each failure signature in the library characterizes a known failure mechanism associated with a component in the set of components, and the failure signature is stored at a high-resolution;
   receiving a telemetry signal which is measured from a component under surveillance, wherein the telemetry signal is measured at a low-resolution;
   determining if there is an anomaly in the telemetry signal, and if so:
       performing pattern-matching operations between the telemetry signal and failure signatures in the library; and
       if a match is found, identifying the failure mechanism for the component under surveillance based on the matching failure signature,
   wherein the pattern-matching operations recall the high-resolution failure signature based on the low-resolution telemetry signal.

2. The method of claim 1, wherein constructing the library of failure signatures involves constructing a failure signature for each known failure mechanism of a component, which involves:
   receiving one or more faulty specimens of the component, wherein the one or more faulty specimens are associated with a known failure mechanism;
   collecting telemetry signals from the one or more faulty specimens, wherein the telemetry signals contain the failure signature of the known failure mechanism associated with the component, and wherein the telemetry signals have sufficiently high-resolution and high-sampling-rate for use in pattern-matching operations; and
   storing the failure signature for the known failure mechanism of the component in the library of failure signatures.

3. The method of claim 1, wherein constructing the library of failure signatures involves storing the failure signatures in one or more auto-associative memory matrices of failure signatures, wherein each auto-associative memory matrix contains failure signatures for at least one corresponding type or level of failure patterns.

4. The method of claim 3, wherein performing the pattern-matching operations between the telemetry signal and the failure signatures in the library involves using an auto-associative memory, which involves:
   feeding the anomalous telemetry signal as an input vector into the auto-associative memory; and
   allowing the auto-associative memory to restore a matching failure signature for the input vector from the auto-associative memory matrix.

5. The method of claim 4, wherein restoring the matching failure signature facilitates reconstructing a high-resolution, high-sampling-rate failure signature from a low-resolution, low-sampling-rate input telemetry signal.

6. A computer-readable storage medium storing instructions that when executed by a computer cause the computer to perform a method for identifying a failure mechanism for a component, the method comprising:
   constructing a library of failure signatures from a set of components, wherein each failure signature in the library characterizes a known failure mechanism associated with a component in the set of components, and the failure signature is stored at a high-resolution;
   receiving a telemetry signal which is measured from a component under surveillance, wherein the telemetry signal is measured at a low-resolution;
   determining if there is an anomaly in the telemetry signal, and if so:
       performing pattern-matching operations between the telemetry signal and failure signatures in the library; and
       if a match is found, identifying the failure mechanism for the component under surveillance based on the matching failure signature,
   wherein the pattern-matching operations recall the high-resolution failure signature based on the low-resolution telemetry signal.

7. The computer-readable storage medium of claim 6, wherein constructing the library of failure signatures involves constructing a failure signature for each known failure mechanism of a component, which involves:
   receiving one or more faulty specimens of the component, wherein the one or more faulty specimens are associated with a known failure mechanism;
   collecting telemetry signals from the one or more faulty specimens, wherein the telemetry signals contain the failure signature of the known failure mechanism associated with the component, and wherein the telemetry signals have sufficiently high-resolution and high-sampling-rate for use in pattern-matching operations; and
   storing the failure signature for the known failure mechanism of the component in the library of failure signatures.

8. The computer-readable storage medium of claim 6, wherein constructing the library of failure signatures involves storing the failure signatures in one or more auto-associative memory matrices of failure signatures, wherein each auto-associative memory matrix contains failure signatures for at least one corresponding type or level of failure patterns.

9. The computer-readable storage medium of claim 8, wherein performing the pattern-matching operations between the telemetry signal and the failure signatures in the library involves using an auto-associative memory, which involves:
   feeding the anomalous telemetry signal as an input vector into the auto-associative memory; and
   allowing the auto-associative memory to restore a matching failure signature for the input vector from the auto-associative memory matrix.

10. The computer-readable storage medium of claim 9, wherein restoring the matching failure signature facilitates reconstructing a high-resolution, high-sampling-rate failure signature from a low-resolution, low-sampling-rate input telemetry signal.

11. An apparatus that identifies a failure mechanism for a component, comprising:
   a construction mechanism configured to construct a library of failure signatures from a set of components, wherein each failure signature in the library characterizes a known failure mechanism associated with a component in the set of components, and the failure signature is stored at a high-resolution;
   a receiving mechanism configured to receive a telemetry signal which is measured from a component under surveillance, wherein the telemetry signal is measured at a low-resolution;
   a determination mechanism configured to determine if there is an anomaly in the telemetry signal,
   wherein the determination mechanism is further configured to:
      perform pattern-matching operations between the telemetry signal and failure signatures in the library; and
      if a match is found, to identify a failure mechanism for the component under surveillance based on the matching failure signature,
   wherein the pattern-matching operations recall the high-resolution failure signature based on the low-resolution telemetry signal.

12. The apparatus of claim 11, wherein the construction mechanism is further configured to construct a failure signature for each known failure mechanism of a component by:
   receiving one or more faulty specimens of the component, wherein the one or more faulty specimens are associated with a known failure mechanism;
   collecting telemetry signals from the one or more faulty specimens, wherein the telemetry signals contain the failure signature of the known failure mechanism associated with the component, and wherein the telemetry signals have sufficiently high-resolution and high-sampling-rate for use in pattern-matching operations; and
   storing the failure signature for the known failure mechanism of the component in the library of failure signatures.

13. The apparatus of claim 11, wherein, when constructing the library of failure signatures, the construction mechanism is configured to store the failure signatures in one or more auto-associative memory matrices of failure signatures, wherein each auto-associative memory matrix contains failure signatures for at least one corresponding type or level of failure patterns.

14. The apparatus of claim 13, wherein the determination mechanism is further configured to perform the pattern-matching operations between the telemetry signal and the failure signatures in the library by using an auto-associative memory, which involves:
   feeding the anomalous telemetry signal as an input vector into the auto-associative memory; and
   allowing the auto-associative memory to restore a matching failure signature for the input vector from the auto-associative memory matrix.

15. The apparatus of claim 14, wherein restoring the matching failure signature facilitates reconstructing a high-resolution, high-sampling-rate failure signature from a low-resolution, low-sampling-rate input telemetry signal.

* * * * *